United States Patent
Yoshida

(10) Patent No.: US 10,124,601 B2
(45) Date of Patent: Nov. 13, 2018

(54) IMAGE PROCESSOR AND STORAGE MEDIUM STORING PROGRAM

(71) Applicant: BROTHER KOGYO KABUSHIKI KAISHA, Nagoya-shi, Aichi-ken (JP)

(72) Inventor: Yasunari Yoshida, Aichi-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/707,488

(22) Filed: Sep. 18, 2017

(65) Prior Publication Data
US 2018/0079224 A1    Mar. 22, 2018

(30) Foreign Application Priority Data
Sep. 22, 2016 (JP) ................................. 2016-184947

(51) Int. Cl.
B41J 2/36 (2006.01)
H04N 1/00 (2006.01)
H04N 1/409 (2006.01)

(52) U.S. Cl.
CPC .......... B41J 2/362 (2013.01); H04N 1/00068 (2013.01); H04N 1/409 (2013.01)

(58) Field of Classification Search
CPC ...... B41J 2/362; H04N 1/00068; H04N 1/409
See application file for complete search history.

(56) References Cited

U.S. PATENT DOCUMENTS

| 8,055,180 | B2 * | 11/2011 | Murakami | ......... | H04N 1/00883 |
| | | | | | 283/113 |
| 2009/0002414 | A1 * | 1/2009 | Shibata | .................. | B41J 2/2132 |
| | | | | | 347/9 |

FOREIGN PATENT DOCUMENTS

| JP | 2000-138832 A | 5/2000 | | |
| JP | 2000138832 | * 5/2000 | .............. | B41J 21/00 |

* cited by examiner

Primary Examiner — Henok Legesse
(74) Attorney, Agent, or Firm — Merchant & Gould P.C.

(57) ABSTRACT

An image processor performs: determining a dot value indicating a dot formation state, the determining including: in a case where a target pixel is not an edge pixel and a first dot forming condition is satisfied, setting the dot value to a value indicating forming a first dot; and in a case where a second dot forming condition is satisfied, setting the dot value to a value indicating forming a second dot; determining a distribution error value, the determining including: in the case where the target pixel is not the edge pixel and the first dot forming condition is satisfied, setting the distribution error value to a value corresponding to a density of the first dot; and in the case where the second dot forming condition is satisfied, setting the distribution error value to a smaller value than a value corresponding to a density of the second dot.

20 Claims, 8 Drawing Sheets

FIG. 5A
ERROR MATRIX MT
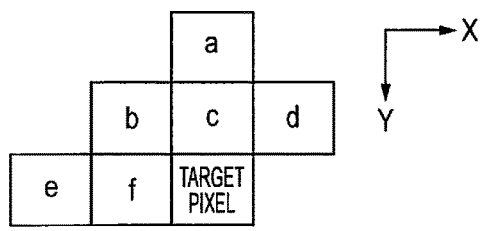
FIG. 5B
DETERMINATION FILTER GROUP FG
(B1) FILTER FOR RIGHT-SIDE EDGE     (B2) FILTER FOR LEFT-SIDE EDGE
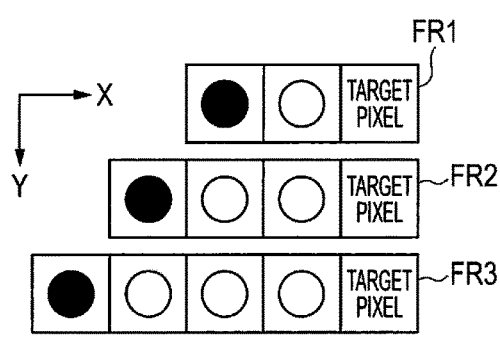   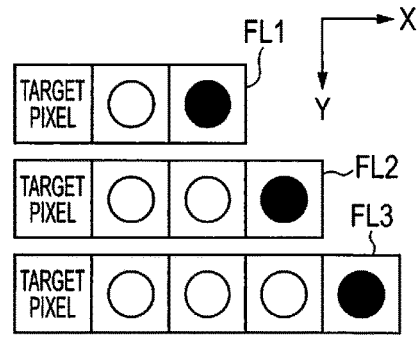
(B3) FILTER FOR LOWER EDGE     (B4) FILTER FOR UPPER EDGE
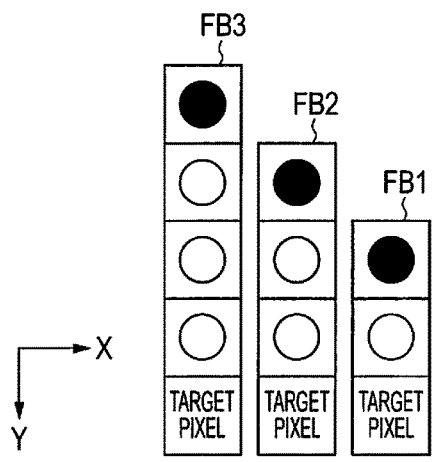   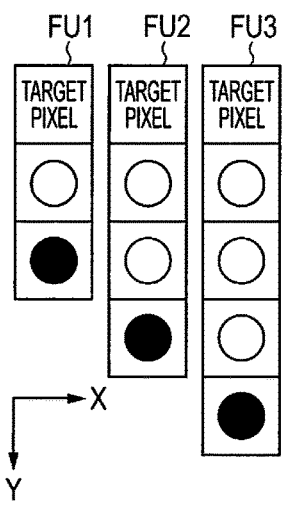

IMAGE PROCESSOR AND STORAGE MEDIUM STORING PROGRAM

CROSS REFERENCE TO RELATED APPLICATIONS

This application claims priority from Japanese Patent Application No. 2016-184947 filed Sep. 22, 2016. The entire content of the priority application is incorporated herein by reference.

TECHNICAL FIELD

This specification relates to image processing for printing, and particularly relates to processing for determining a dot value indicative of a dot formation state for each pixel.

BACKGROUND

In a known image processing method, in an image represented by black dots (print dots) and non-print dots, when there is a non-print dot surrounded by black dots (a white part on a colored background), black dots located above and below the white part are changed into smaller dots than usual. This intends to prevent the white part from being formed narrowly in a printed image.

SUMMARY

According to one aspect, this specification discloses an image processor for a printer. The image processor includes a processor and a memory storing instructions. When executed by the processor, the instructions cause the processor to perform: acquiring original image data representing an original image including a plurality of pixels, the original image data being indicative of a density of each of the plurality of pixels; determining whether a target pixel in the plurality of pixels is an edge pixel, the edge pixel being a pixel constituting background and constituting an edge between the background and an object having a lower density than the background; determining whether a first dot forming condition of an error diffusion method is satisfied, by using a density of the target pixel and an error value distributed to the target pixel; determining a dot value indicative of a dot formation state of the target pixel, the determining the dot value including: in a case where the target pixel is not the edge pixel and the first dot forming condition is satisfied, setting the dot value to a value indicative of forming a first dot; and in a case where a second dot forming condition is satisfied, setting the dot value to a value indicative of forming a second dot, the second dot forming condition including that the target pixel is the edge pixel; determining a distribution error value to be distributed to an unprocessed pixel, the determining the distribution error value including: in the case where the target pixel is not the edge pixel and the first dot forming condition is satisfied, setting the distribution error value to a value corresponding to a density of the first dot; and in the case where the second dot forming condition is satisfied, setting the distribution error value to a smaller value than a value corresponding to a density of the second dot; and generating print data including the dot value of each of the plurality of pixels determined by processing each of the plurality of pixels as the target pixel.

According to another aspect, this specification also discloses a non-transitory computer-readable storage medium storing a set of program instructions executable on an image processor for a printer. The set of program instructions includes: acquiring original image data representing an original image including a plurality of pixels, the original image data being indicative of a density of each of the plurality of pixels; determining whether a target pixel in the plurality of pixels is an edge pixel, the edge pixel being a pixel constituting background and constituting an edge between the background and an object having a lower density than the background; determining whether a first dot forming condition of an error diffusion method is satisfied, by using a density of the target pixel and an error value distributed to the target pixel; determining a dot value indicative of a dot formation state of the target pixel, the determining the dot value including: in a case where the target pixel is not the edge pixel and the first dot forming condition is satisfied, setting the dot value to a value indicative of forming a first dot; and in a case where a second dot forming condition is satisfied, setting the dot value to a value indicative of forming a second dot, the second dot forming condition including that the target pixel is the edge pixel; determining a distribution error value to be distributed to an unprocessed pixel, the determining the distribution error value including: in the case where the target pixel is not the edge pixel and the first dot forming condition is satisfied, setting the distribution error value to a value corresponding to a density of the first dot; and in the case where the second dot forming condition is satisfied, setting the distribution error value to a smaller value than a value corresponding to a density of the second dot; and generating print data including the dot value of each of the plurality of pixels determined by processing each of the plurality of pixels as the target pixel.

BRIEF DESCRIPTION OF THE DRAWINGS

Embodiments in accordance with this disclosure will be described in detail with reference to the following figures wherein:

FIG. 5A is a chart showing an example of an error matrix MT;

FIG. 5B is a chart showing an example of a filter group FG;

DETAILED DESCRIPTION

However, the above-described technology does not sufficiently consider a stage of determining a dot value indicative of a dot formation state based on original image data indicative of density of a plurality of pixels. When using the above-described technology, in the stage of determining the dot value indicative of the dot formation state based on the original image data, there is a case where a region corresponding to a particular pixel of the original image becomes narrow in a print image. Thus, there is a possibility that the print quality of the print image deteriorates.

In view of the foregoing, this specification discloses technology for suppressing narrowing of a region corresponding to a particular pixel of an original image in a print image, at the time of determining a dot value indicative of a dot formation state based on original image data.

A. First Embodiment

A-1. Configuration of Printing System 1000

Figure 1:
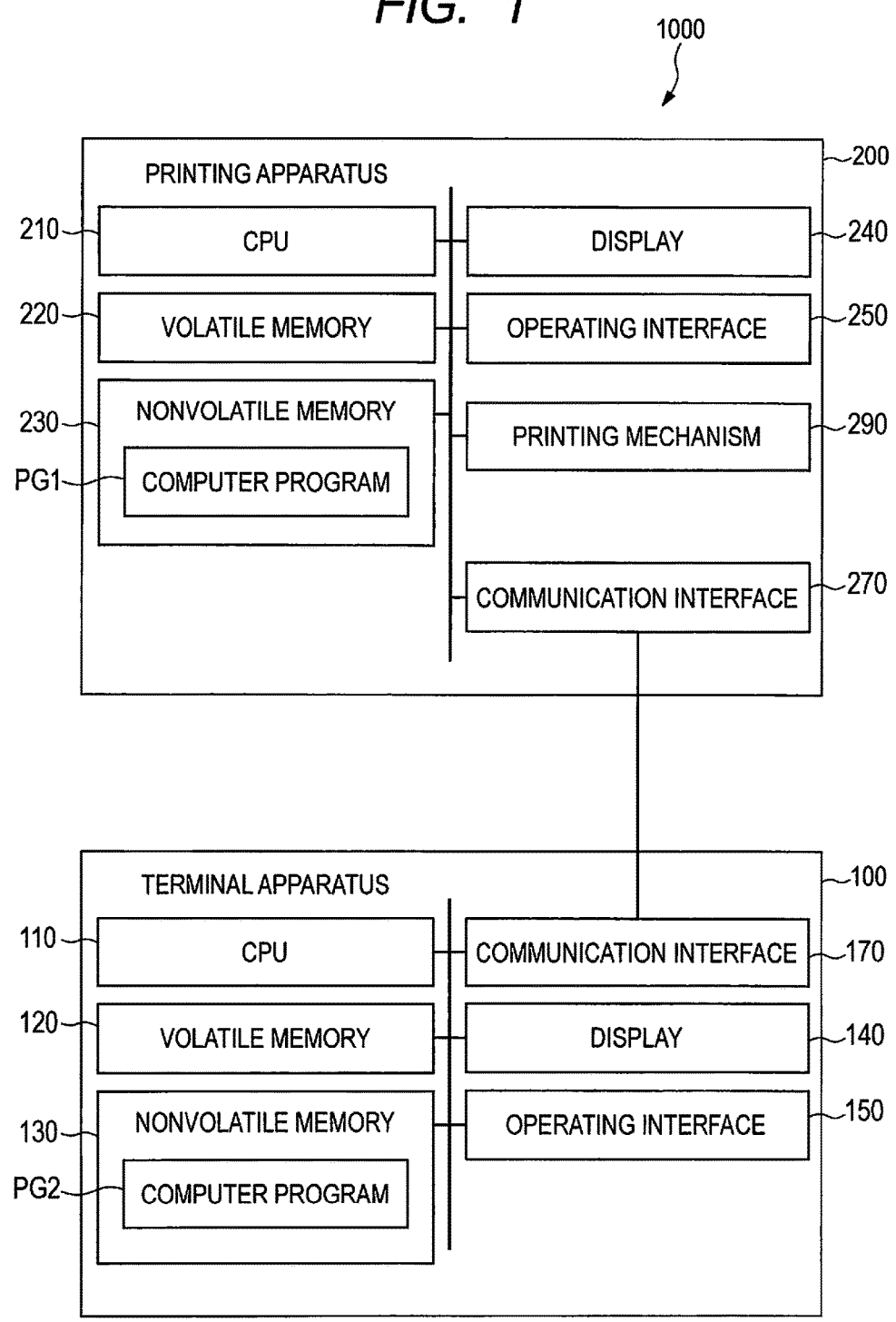
FIG. 1 is a block diagram illustrating a configuration of a printing system.

As shown in FIG. 1, the printing system 1000 is provided with a terminal apparatus 100 as an image processor for a printer and a printer 200 as the printer. The terminal apparatus 100 and the printer 200 are communicably connected to each other through a LAN (Local Area Network), a USB cable, or the like.

The printer 200 is provided with: a CPU 210 as a controller of the printer 200; a volatile memory 220 such as a DRAM; a nonvolatile memory 230 such as a flash memory and a hard disk drive; a display 240, such as a liquid crystal display, for showing user interface screens (hereinafter, also refer to as "UI screen"); an operating interface 250 configured to acquire users operation, such as a touch panel and buttons; a communication interface 270 configured to communicate with external devices; and a printing mechanism 290. For example, the communication interface 270 includes an interface for connection to a network, such as a LAN, and a USB interface for connecting with external devices.

The printing mechanism 290 is an inkjet-type printing mechanism which prints images using a plurality of kinds of ink as the colorant. The printing mechanism 290 creates an image on paper by forming dots of ink injected from nozzles of a printing head. The printing mechanism 290 is configured to form a plurality of sizes of dots for each ink: for example, a small dot, a medium dot larger than the small dot, and a large dot larger than the medium dot. The plurality of types of ink in this embodiment includes four kinds of ink of cyan (C), magenta (M), yellow (Y), and black (B).

The volatile memory 220 provides a buffer region for temporarily storing various data produced by processing of the CPU 210. The nonvolatile memory 230 stores a computer program PG1 therein. The computer program PG1 is stored in the nonvolatile memory 230 in advance at a time of production of the printer 200. Alternatively, the computer program PG1 may be provided by downloading from a server connected through the Internet or provided by being recorded in a storage medium such as a DVD-ROM.

The CPU 210 controls the printer 200 by executing the computer program PG1. For instance, the CPU 210 executes printing by controlling the printing mechanism 290 in accordance with an instruction from the terminal apparatus 100.

The terminal apparatus 100 is a known computer used by the user of the printer 200, and is a personal computer or a smart phone, for example. The terminal apparatus 100 is provided with: a CPU 110 as a controller of the terminal apparatus 100; a volatile memory 120 such as a DRAM; a nonvolatile memory 130 such as a flash memory and a hard disk drive; a display 140 for displaying screens including a UI screen, such as a liquid crystal display; an operating interface 150 configured to acquire users' operation input, such as a keyboard and a mouse; and a communication interface 170 configured to communicate with external devices such as the printer 200. For example, the communication interface 170 includes an interface for connection to a network such as LAN and a USB interface for connection to external devices.

The volatile memory 120 provides a buffer region for temporarily storing various data produced by processing of the CPU 110. The nonvolatile memory 130 stores a computer program PG2. The computer program PG2 may be, for example, a printer diver program provided by a manufacturer of the printer 200. The computer program PG2, for example, is provided by downloading from a server connected through an internet. Alternatively, the computer program PG2 may also be provided by being recorded in a storage medium such as a DVD-ROM.

By executing the computer program PG2, the CPU 110 executes a process as a printer driver for the printer 200 such as a printing process described below.

A-2. Printing Process

Figure 2:
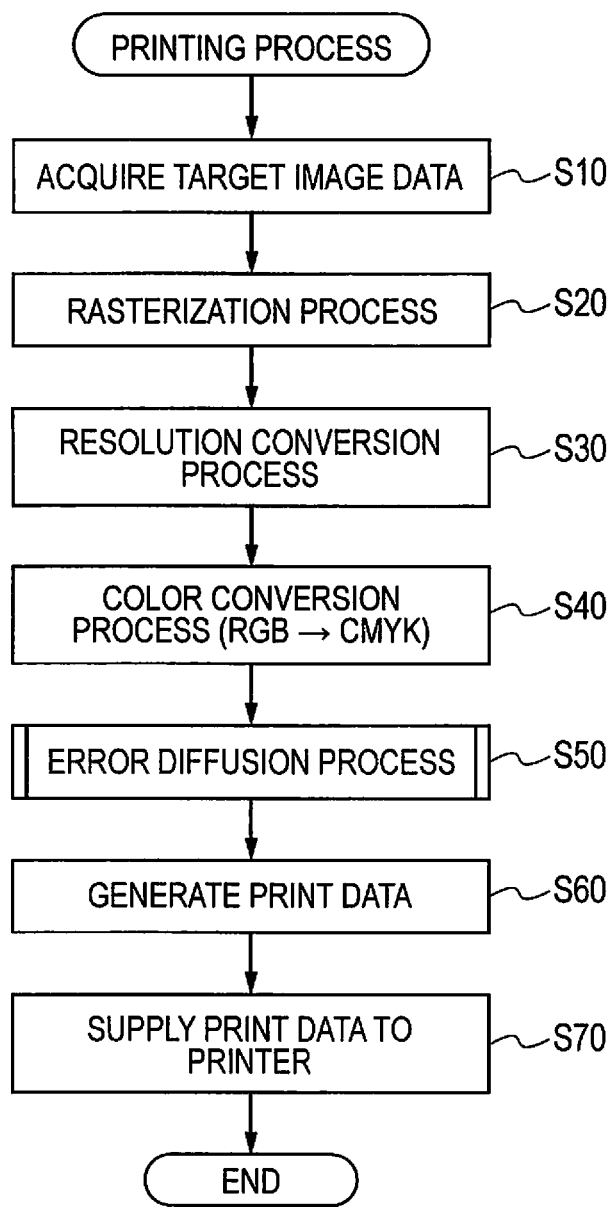
FIG. 2 is a flowchart of a printing process of a first embodiment.

As shown in FIG. 2, the printing process starts in the terminal apparatus 100, for example, when the printer driver (the computer program PG2) is started through an application program such as word processing software and drawing software and then a print instruction is inputted to the printer driver. In this embodiment, the print instruction includes at least an instruction for specifying a target image data to be used for printing.

In S10, the CPU 110 acquires the target image data specified by the print instruction. The target image data may be, for example, an image data (vector data) produced by the application program.

In S20, the CPU 110 executes a rasterization process on the acquired target image data. The rasterization process is a process to convert the target image data into bit map data. The bit map data is, for example, RGB image data which expresses color of each pixel with RGB values. The RGB values of one pixel include tone values of three color components: i.e. red (R), green (G), and blue (B) (e.g., tone value of 256 tones from 0 to 255). In S30, the CPU 110 executes a resolution conversion process on the RGB image data to convert the RGB image data into image data having the number of pixels corresponding to the print resolution.

In S40, the CPU 110 executes a color conversion process on the RGB image data to generate CMYK image data which expresses color of each pixel by CMYK values. The CMYK values include a plurality of kinds of color values (i.e. C value, M value, Y value, and K value) corresponding to a plurality of kinds of ink (i.e. C, M, Y, and K) used in the printing mechanism 290. Each component value of the CMYK value in this embodiment is a value of 256 tones from 0 to 255. The color conversion process is performed by using a lookup table (not shown) which specifies the correspondence relation between the RGB tone values and the CMYK tone values.

In S50, the CPU 110 executes an error diffusion process on the CMYK image data to generate dot data indicative of a dot formation state for each pixel and for each kind of ink. The dot formation state in this embodiment is any one of no dot, small dot, medium dot, and large dot. In other words, the value of plurality of pixels (also referred to as "dot value") included in the dot data is any one of a value indicative of forming no dot, a value indicative of forming a small dot, a value indicative of forming a medium dot, and a value indicative of forming a large dot.

In S60, the CPU 110 rearranges the dot data in a printing order and adds control data such as printing command to generate print data. In S70, the CPU 110 provides the generated print data to the printer 200 and then ends the printing process. In accordance with the print data provided from the terminal apparatus 100, the CPU 210 of the printer 200 controls the printing mechanism 290 to print the image on paper.

A-3. Error Diffusion Process

Figure 3:
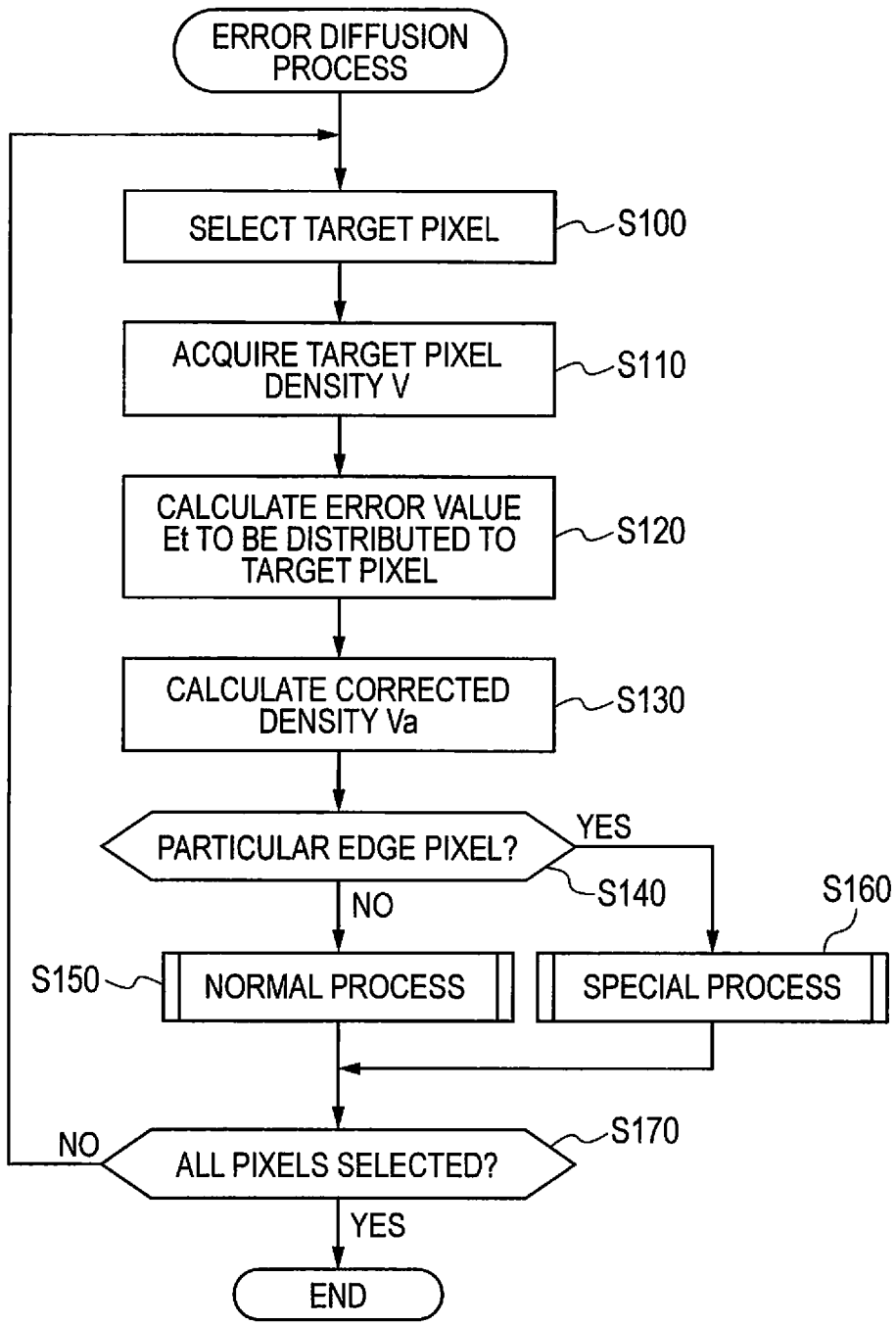
FIG. 3 is a flowchart of an error diffusion process.
Figure 4A:
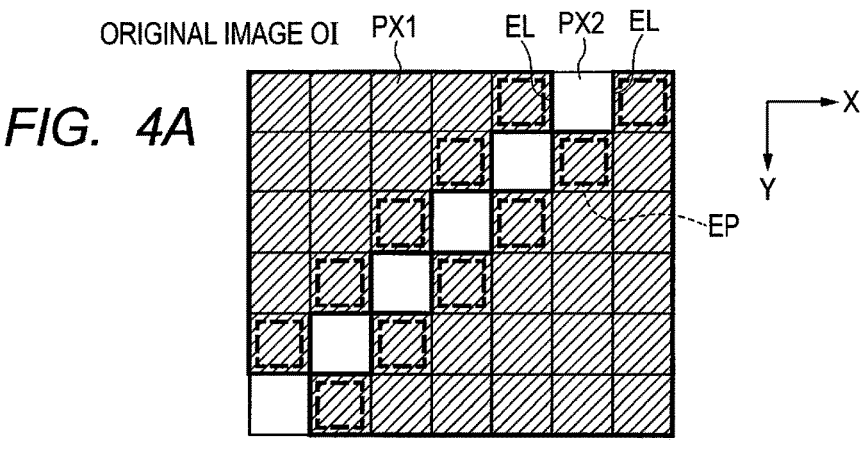
FIGS. 4A, 4B, and 4C are explanatory diagrams of the error diffusion process.

Hereinafter, the error diffusion process (S50) shown in FIG. 2 will be described. As shown in FIG. 3, CMYK image data includes four component image data corresponding to ink of C, M, Y, and K, respectively. The value of a plurality of pixels included in each component image data indicates density of corresponding ink for each pixel. The process of FIG. 3 is for one component image data corresponding to one kind of ink. The process of FIG. 3 is performed for each of the four component image data. FIG. 4A shows an image expressed by one component image data (also referred to as "original image OI").

In S100, the CPU 110 selects one target pixel, which is to be a target of the following process from S110 to S160, among a plurality of pixels contained in the original image OI. For example, in the original image OI of FIG. 4A, a plurality of pixels is arranged in a matrix shape in X direction (horizontal direction) and Y direction (vertical direction). The CPU 110 executes processing one pixel after another as the target pixel in the +X direction, thereby executing processing of one pixel line extending in the X direction. When processing of one image pixel line is completed, the CPU 110 executes processing one pixel after another as the target pixel for another image line adjacent to the processed line in the +Y direction.

In S110, the CPU 10 acquires a target pixel density V (density of a target pixel). In S120, the CPU 110 acquires an error value Et distributed to the target pixel from the adjacent already-processed pixels by using an error matrix MT. As shown in FIG. 5A, the error matrix MT assigns a weight larger than zero to pixels arranged at certain relative positions close to the target pixel. An example shown in FIG. 5A illustrates that weight from a to f are assigned to each of six pixels close to the target pixel. The total of the weights from a to f is one. The six pixels close to the target pixel shown in the error matrix MT have already been processed as a target pixel prior to the current target pixel, respectively, and the error values corresponding to these pixels have been calculated in such process. By using the weights specified by the error matrix MT, the CPU 110 calculates the weighted sum of the error values corresponding to these six pixels close to the target pixel as the error value Et.

In S130, the CPU 110 calculates a corrected density Va by using the target pixel density V and the error value Et. Specifically, the sum of the target pixel density V and the error value Et is calculated as the corrected density Va.

In S140, the CPU 110 determines whether the target pixel is a particular edge pixel. The particular edge pixel includes a right-side edge pixel, a left-side edge pixel, a lower edge pixel, and an upper edge pixel. A filter group FG shown in FIG. 5B is used to determine whether the target pixel is the particular edge pixel. The filter group FG includes a filter for right-side edge, a filter for left-side edge, a filter for lower edge, and a filter for upper edge.

The filter for right-side edge of the filter group FG includes three filters FR1 to FR3 (FIG. 5B (B1)) for determining whether the target pixel is the right-side edge pixel. The pixels to be checked by the filter FR1 are a total of three pixels including the target pixel and two pixels having a pixel adjacent to the target pixel at the left side thereof (−X direction) and arrayed in the X direction. The pixels to be checked by the filter FR2 are a total of four pixels including the target pixel and three pixels having a pixel adjacent to the target pixel at the left side thereof (−X direction) and arrayed in the X direction. The pixels to be checked by the filter FR3 are a total of five pixels including the target pixel and four pixels having a pixel adjacent to the target pixel at the left side thereof (−X direction) and arrayed in the X direction. The target pixel is determined to be the right-side edge pixel when the pixels to be checked by any one of the three filters FR1 to FR3 satisfy both of the following conditions (1) and (2).

(1) The density of pixels at both ends of three to five pixels to be checked (hereinafter referred to as "both end pixels"), that is, both of a target pixel and a pixel at an opposite end from the target pixel (pixels shown by black filled circles in FIG. 5B) is higher than or equal to a reference density Th1.

(2) The density of one to three pixels to be checked arrayed between the both end pixels (hereinafter referred to as "intermediate pixels"), that is, the density of pixels shown by white circles in FIG. 5B is lower than or equal to a reference density Th2.

In the present embodiment, the reference density Th1 may be a small dot density VSdot described later, or may be a smaller value than the small dot density VSdot. In the present embodiment, the reference density Th2 is a lowest density. When represented by density of 256 tones of 0 to 255, the reference density Th2 is "0", for example.

Determination is made similarly for the left-side edge pixel. Specifically, the filter for left-side edge of the filter group FG includes three filters FL1 to FL3 (FIG. 5B (B2)) for determining whether the target pixel is the left-side edge pixel. The pixels to be checked by the filters FL1 to FL3 are a total of three to five pixels including the target pixel and two to four pixels having a pixel adjacent to the target pixel at the right side thereof (+X direction) and arrayed in the X direction. The target pixel is determined to be the left-side edge pixel when the pixels to be checked by any one of the three filters FL1 to FL3 satisfy both of the above conditions (1) and (2).

Determination is made similarly for the lower edge pixel. Specifically, the filter for lower edge of the filter group FG includes three filters FB1 to FB3 (FIG. 5B (B3)) for determining whether the target pixel is the lower edge pixel. The pixels to be checked by the filters FB1 to FB3 are a total of three to five pixels including the target pixel and two to four pixels having a pixel adjacent to the target pixel at the upper side thereof (−Y direction) and arrayed in the Y direction. The target pixel is determined to be the lower edge pixel when the pixels to be checked by any one of the three filters FB1 to FB3 satisfy both of the above conditions (1) and (2).

Determination is made similarly for the upper edge pixel. Specifically, the filter for upper edge of the filter group FG includes three filters FU1 to FU3 (FIG. 5B (B4)) for determining whether the target pixel is the upper edge pixel. The pixels to be checked by the filters FU1 to FU3 are a total of three to five pixels including the target pixel and two to four pixels having a pixel adjacent to the target pixel at the lower side thereof (+Y direction) and arrayed in the Y direction. The target pixel is determined to be the upper edge pixel when the pixels to be checked by any one of the three filters FU1 to FU3 satisfy both of the above conditions (1) and (2).

As can be seen from the above descriptions, the particular edge pixel is one of a pair of both end pixels. The both end pixels are located at both ends of intermediate pixels in a particular direction (X direction or Y direction in the present embodiment), and are a pair of pixels forming edges with intermediate pixels and having higher density than the intermediate pixels. The intermediate pixels are a number of pixels larger than or equal to one and less than or equal to N arrayed in the particular direction (N is an integer larger than or equal to one, N=3 in the example of FIG. 5B).

For example, in the original image OI in FIG. 4A, a plurality of pixels PX1 with hatching is pixels having densities higher than or equal to the reference density Th1, and forms background. A plurality of pixels PX2 without hatching is intermediate pixels having densities lower than or equal to the reference density Th2 (for example, pixels having density of zero), and forms a thin line having a lower density than the background. For example, this thin line is a part of a small character having a height of four points (approximately 1.4 mm). Pixels EP having a broken-line rectangular therein, out of the plurality of pixels PX1 with hatching, are the particular edge pixels. Thus, the particular edge pixel can be referred to as a pixel forming background and also forming an edge with an object having a lower density than the background (for example, a character having a low density such as a white character).

If the target pixel is not the particular edge pixel (S140: No), the CPU 110 executes a normal process in S150. If the target pixel is the particular edge pixel (S140: Yes), the CPU 110 executes a special process in S160. By executing either the normal process or the special process, a dot value DV of the target pixel is determined, and a distributed error value Ed corresponding to the target pixel is determined. The distributed error value Ed corresponding to the target pixel means an error value to be distributed from the target pixel to unprocessed pixels. The normal process and the special process will be described later.

In S170, the CPU 110 determines whether all of the pixels in the original image OI have been selected as the target pixel. If an unprocessed pixel exists (S170: No), the CPU 110 returns to S100 so as to select the unprocessed pixel. If all of the pixels has been selected as the target pixel (S170: Yes), the CPU 110 ends the error diffusion process.

A-4. Normal Process

Figure 6:
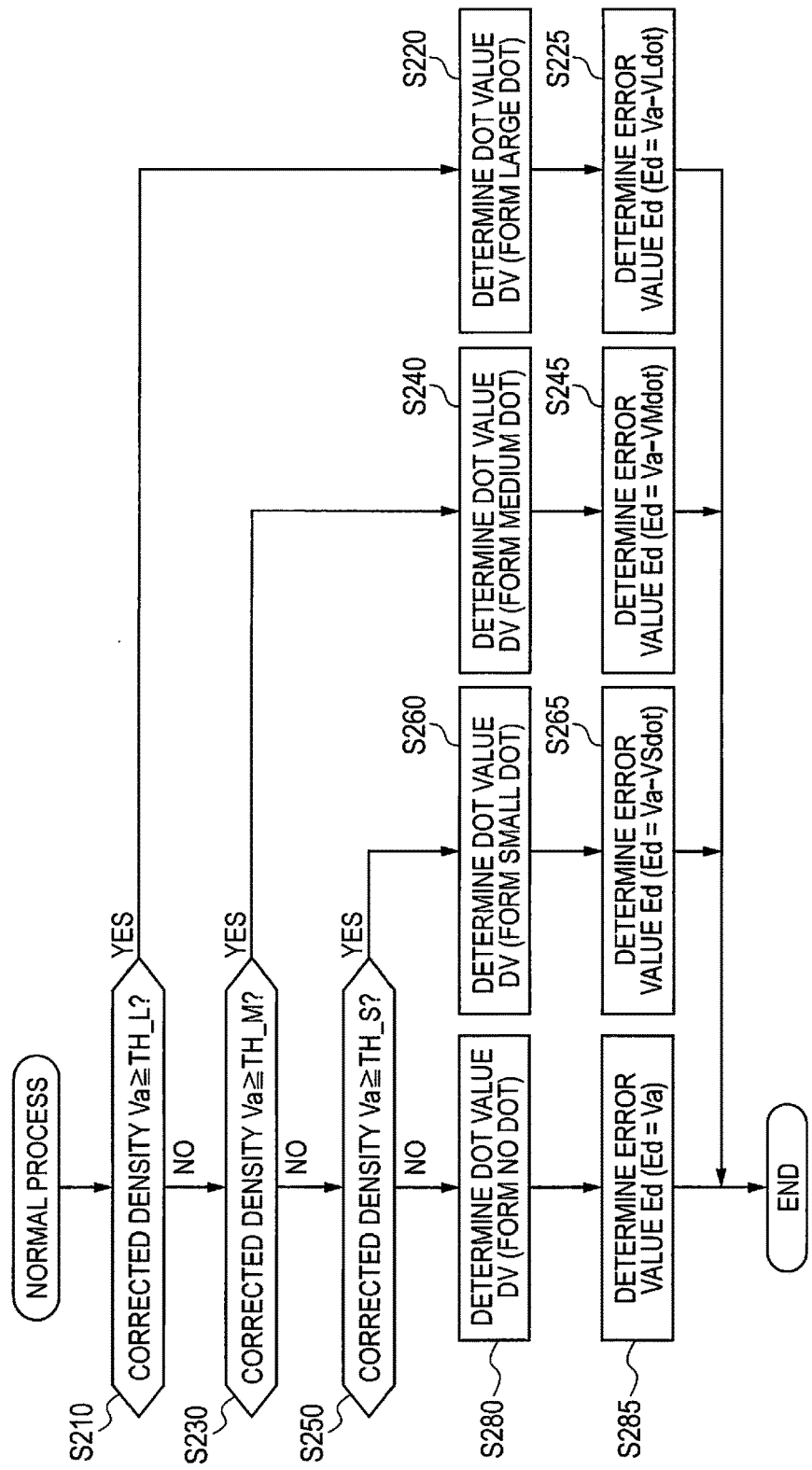
FIG. 6 is a flowchart of a normal process.

As shown in FIG. 6, in S210, the CPU 110 determines whether the corrected density Va is higher than or equal to a determination threshold for large dot TH_L. When the corrected density Va is higher than or equal to the determination threshold for large dot TH_L (S210: Yes), the CPU 110 sets the dot value DV to a value indicative of formation of a large dot in S220. In S225, the CPU 110 sets the distributed error value Ed to a value that is calculated by subtracting a value of a large dot density VLdot from the corrected density Va. The distributed error value Ed=(Va−VLdot) in this case is an error value to be distributed from the target pixel when a large dot is formed in the target pixel of the print image (also referred to as an error value corresponding to the large dot density). The large dot density VLdot in this embodiment is the maximum density. For example, the large dot density VLdot is 255 when the density is represented by the value of 256 tones from 0 to 255. The determination threshold for large dot TH_L is a smaller value than the large dot density VLdot. For example, the determination threshold for large dot TH_L is 128 when the density is represented by the value of 256 tones from 0 to 255.

In a case where the corrected density Va is lower than the determination threshold for large dot TH_L (S210: No), in S230, the CPU 110 determines whether the corrected density Va is higher than or equal to a determination threshold for medium dot TH_M. When the corrected density Va is higher than or equal to the determination threshold for medium dot TH_M (S230: Yes), in S240, the CPU 110 sets the dot value DV to a value indicative of forming a medium dot. In S245, the CPU 110 sets the distributed error value Ed to a value that is calculated by subtracting a value of a medium dot density VMdot from the corrected density Va. The distributed error value Ed=(Va−VMdot) in this case is an error value to be distributed from the target pixel when forming a medium dot in the target pixel of the print image (also referred to as an error value corresponding to the medium dot density). The medium dot density VMdot is, for example, 128 when the density is represented by the value of 256 tones from 0 to 255. The determination threshold for medium dot TH_M is a smaller value than the medium dot density VMdot. For example, the determination threshold for medium dot TH_M is 64 when the density is represented by the value of 256 tones from 0 to 255.

In a case where the corrected density Va is lower than the determination threshold for medium dot TH_M (S230: No), in S250, the CPU 110 determines whether the corrected density Va is higher than or equal to a determination threshold for small dot TH_S. In a case where the corrected density Va is higher than or equal to the determination threshold for small dot TH_S (S250: Yes), in S260, the CPU 110 sets the dot value DV to a value indicative of forming a small dot. In S265, the CPU 110 sets the distributed error value Ed to a value that is calculated by subtracting a value of the small dot density VSdot from the corrected density Va. The distributed error value Ed=(Va−VSdot) in this case is an error value to be distributed from the target pixel when a small dot is formed in the target pixel of the print image (also referred to as an error value corresponding to the small dot density.). The small dot density VSdot is, for example, 64 when the density is represented by the value of 256 tones from 0 to 255. The determination threshold for small dot TH_S is a smaller value than the small dot density VSdot. For example, the determination threshold for small dot TH_S is one (1) when the density is represented by the value of 256 tones from 0 to 255.

In a case where the corrected density Va is lower than the determination threshold for small dot TH_S (S250: No), in S280, the CPU 110 sets the dot value DV to a value indicative of forming no dot. In S285, the CPU 110 sets the distributed error value Ed to the corrected density Va.

Once the dot value DV of the target pixel and the distributed error value Ed have been determined, the normal process ends.

The dot forming condition in the normal process is a dot forming condition of a common error diffusion method, it is described as follows with reference to the above-described flow chart of the normal process. A large dot forming condition is that the corrected density Va is higher than or equal to the determination threshold for large dot TH_L (Va≥TH_L). A medium dot forming condition is that the corrected density Va is lower than the determination threshold for large dot TH_L and is higher than or equal to the determination threshold for medium dot TH_M (TH_M≤Va≤TH_L). A small dot forming condition is that the corrected density Va is lower than the determination threshold for medium dot TH_M and is higher than or equal to the determination threshold for small dot TH_S (TH_S≤Va≤TH_M). Hereinafter, the above-described dot forming condition of the common error diffusion method will be referred to as "first dot forming condition".

A-5. Special Process

Figure 7:
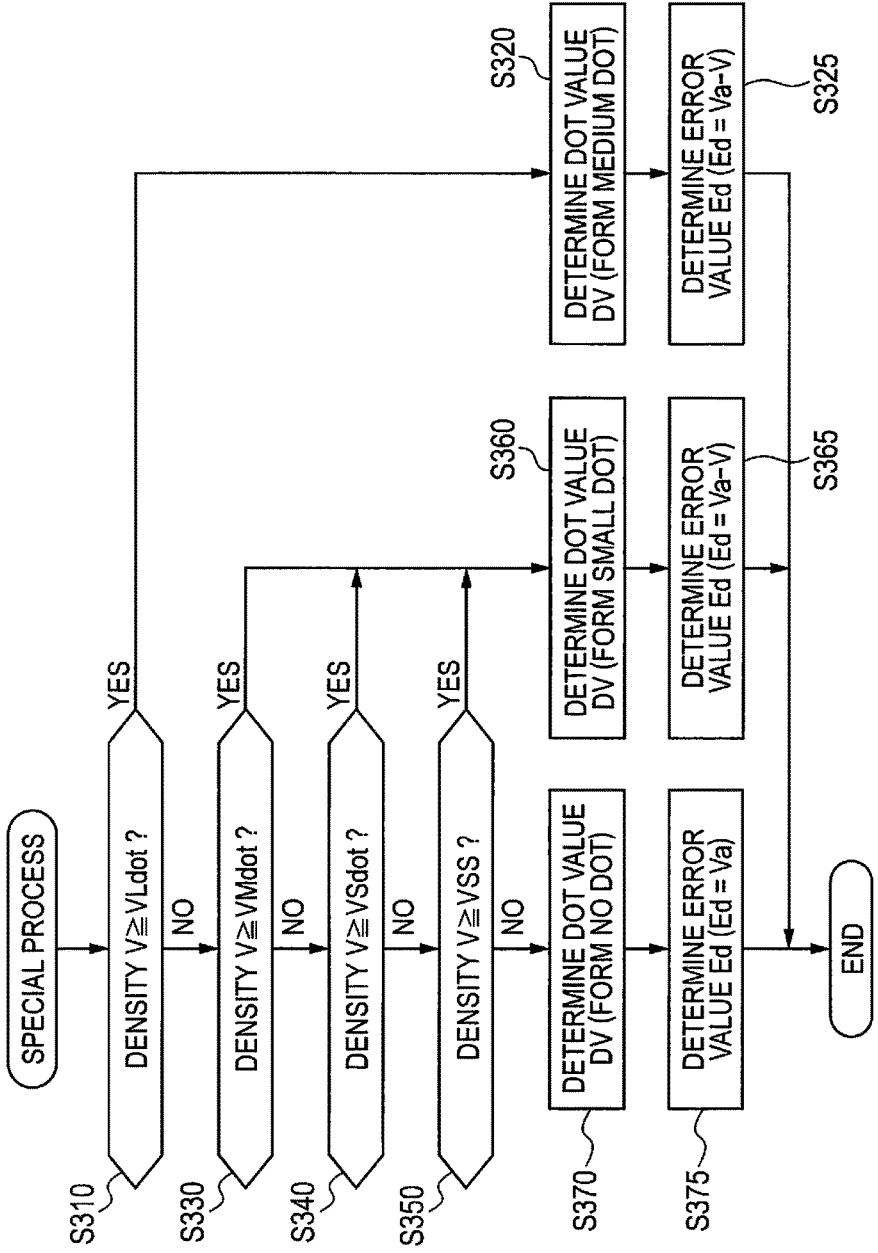
FIG. 7 is a flowchart of a special process of the first embodiment.

In a special process of FIG. 7, the first dot forming condition determined in the normal process is not used. In the special process of FIG. 7, a dot forming condition different from the first dot forming condition is used.

In S310, the CPU 110 determines whether the target pixel density V is higher than or equal to the large dot density VLdot. When the target pixel density V is higher than or equal to the large dot density VLdot (S310: YES), in S320 the CPU 110 sets the dot value DV to a value indicative of forming a medium dot.

In S325, the CPU 110 sets the distribution error value Ed to a value obtained by subtracting the target pixel density V from the corrected density Va. The distribution error value Ed=(Va−V) in this case is, assuming that an imaginary dot having the target pixel density V of an original image is formed in a print image at a position corresponding to the target pixel of the original image, an error value to be distributed from the target pixel (also referred to as an error value corresponding to the density V of the imaginary dot having the target pixel density, or, an error value corresponding to the target pixel density). Because determination in S310 is YES, the target pixel density V is higher than or equal to the large dot density VLdot. Accordingly, in this case, the imaginary dot having the density V is a dot having a density higher than or equal to the large dot density VLdot, and is obviously a dot having a higher density than the middle dot density VMdot (V≥VLdot>VMdot). Thus, the distribution error value Ed (=Va−V) in this case is smaller than or equal to a value (Va−VLdot) corresponding to the large dot density VLdot, and is smaller than a value (Va−VMdot) corresponding to the middle dot density VMdot of the middle dot to be formed (the middle dot that is actually formed in the print image).

When the target pixel density V is lower than the large dot density VLdot (S310: NO), in S330 the CPU 110 determines whether the target pixel density V is higher than or equal to the middle dot density VMdot. When the target pixel density V is higher than or equal to the middle dot density VMdot (S330: YES), in S360 the CPU 110 sets the dot value DV to a value indicative of forming a small dot.

In S365, the CPU 110 sets the distribution error value Ed to a value obtained by subtracting the target pixel density V from the corrected density Va. That is, in a similar manner to S325, the distribution error value Ed is set to the value (Va−V) corresponding to the density of the imaginary dot having the target pixel density V in the print image. Because determination in S310 is NO and determination in S330 is YES, the target pixel density V is higher than or equal to the middle dot density VMdot and lower than the large dot density VLdot. Accordingly, in this case, the imaginary dot having the density V is a dot having a density higher than or equal to the middle dot density VMdot and lower than the large dot density VLdot, and is obviously a dot having a density higher than the small dot density VSdot (VLdot>V VMdot>VSdot). Thus, the distribution error value Ed (=Va−V) in this case is lower than or equal to the value (Va−VMdot) corresponding to the middle dot density VMdot, and is smaller than the value (Va−VSdot) corresponding to the small dot density VSdot of the small dot to be formed.

When the target pixel density V is lower than the middle dot density VMdot (S330: NO), in S340 the CPU 110 determines whether the target pixel density V is higher than or equal to the small dot density VSdot. When the target pixel density V is higher than or equal to the small dot density VSdot (S340: YES), in S360 the CPU 110 sets the dot value DV to a value indicative of forming a small dot.

In S365, the CPU 110 sets the distribution error value Ed to a value obtained by subtracting the target pixel density V from the corrected density Va. That is, the distribution error value Ed is set to the value (Va−V) corresponding to the density of the imaginary dot having the target pixel density V in the print image. Because determination in S330 is NO and determination in S340 is YES, the target pixel density V is higher than or equal to the small dot density VSdot and lower than the middle dot density VMdot. Accordingly, in this case, the imaginary dot having the density V is a dot having a density higher than or equal to the small dot density VSdot and lower than the middle dot density VMdot (VMdot>V≥VSdot). Thus, the distribution error value Ed (=Va−V) in this case is smaller than or equal to the value (Va−VSdot) corresponding to the small dot density VSdot of the small dot to be formed. In other words, except a case where the target pixel density V is equal to the small dot density VSdot (V=VSdot), the distribution error value Ed (=Va−V) is smaller than the value (Va−VSdot) corresponding to the small dot density VSdot of the small dot to be formed.

When the target pixel density V is lower than the small dot density VSdot (S340: NO), in S350 the CPU 110 determines whether the target pixel density V is higher than or equal to a particular density VSS. The particular density VSS is a lower density than the small dot density VSdot. For example, the particular density VSS is a half of the small dot density VSdot (VSS=(VSdot/2)). When the target pixel density V is higher than or equal to the particular density VSS (S350: YES), in S360 the CPU 110 sets the dot value DV to a value indicative of forming a small dot.

In S365, the CPU 110 sets the distribution error value Ed to a value obtained by subtracting the target pixel density V from the corrected density Va. That is, the distribution error value Ed is set to the value (Va−V) corresponding to the density of the imaginary dot having the target pixel density V in the print image. Because determination in S340 is NO and determination in S350 is YES, the target pixel density V is higher than or equal to the particular density VSS and lower than the small dot density VSdot. Accordingly, in this case, the imaginary dot having the density V is a dot having a density higher than or equal to the particular density VSS and lower than the small dot density VSdot (VSdot>V≥VSS). Thus, the distribution error value Ed (=Va−V) in this case is exceptionally a value larger than the value (Va−VSdot) corresponding to the small dot density VSdot of the small dot to be formed.

When the target pixel density V is lower than the particular density VSS (S350: NO), in S370 the CPU 110 sets the dot value DV to a value indicative of forming no dot. In S375, the CPU 110 sets the distribution error value Ed to the corrected density Va. That is, the distribution error value Ed is set to a value corresponding to the density of a dot having a density of zero (a value corresponding to forming no dot).

Here, the condition that the dot value DV is set to the value indicative of forming a small dot or a middle dot in S320 and S360 in the special process of FIG. 7 is also referred to as "second dot forming condition". Because the special process is executed only when the target pixel is the particular edge pixel (S140: YES in FIG. 3), the second dot forming condition includes that the target pixel is the particular edge pixel. In the present embodiment, the second dot forming condition includes that the target pixel density V is higher than or equal to the small dot density VSdot (YES in one of S310, S330, and S340).

In the above-described first embodiment, the CPU 110 determines whether the target pixel is the particular edge pixel (S140 in FIG. 3). Further, the CPU 110 determines whether the first dot forming condition (the dot forming condition of the common error diffusion method) is satisfied (S210, S230, S250 in FIG. 6). When the target pixel is not the particular edge pixel (S140: NO in FIG. 3) and the first dot forming condition is satisfied (YES in one of S210, S230, and S250 in FIG. 6), the dot value DV is set to a value indicative of forming a dot (S220, S240, S260 in FIG. 6). When the target pixel is not the particular edge pixel, a dot to be formed at a position corresponding to the target pixel in the print image is also referred to as "first dot". As can be seen from FIG. 6, the first dot is one of a large dot, a middle dot, and a small dot.

When the target pixel is not the particular edge pixel (S140: NO in FIG. 3) and the first dot forming condition is satisfied (YES in one of S210, S230, and S250 in FIG. 6), the CPU 110 sets the distribution error value Ed to a value corresponding to the density V of the first dot (for example, one of Va−VLdot, Va−VMdot, and Va−VSdot) (S225, S245, S265 in FIG. 6).

When the second dot forming condition is satisfied, the second dot forming condition including that the target pixel is the particular edge pixel (S140: YES in FIG. 3, and YES in one of S310, S330, S340, and S350 in FIG. 7), the CPU 110 sets the dot value to a value indicative of forming a dot (S320, S360 in FIG. 7). When the target pixel is the particular edge pixel, a dot to be formed at a position corresponding to the target pixel in the print image is also referred to as "second dot". As can be seen from FIG. 7, the second dot is one of a middle dot and a small dot.

Further, when the second dot forming condition is satisfied (S140: YES in FIG. 3, and YES in one of S310, S330, S340 in FIG. 7), the CPU 110 sets the distribution error value Ed to a smaller value (Va−V) than a value corresponding to the density of the second dot (one of Va−VMdot and Va−VSdot) (S325, S365).

As a result, according to the first embodiment, the distribution error value Ed distributed to proximity of a particular edge pixel EP forming an edge with an intermediate pixel is relatively small. Thus, in a print image, a dot tends not to be formed adjacent to a position corresponding to the particular edge pixel EP. As a result, at the time of generating dot data in the error diffusion process in S50 of FIG. 2, that is, at the time of determining the dot value DV indicative of the dot formation state, narrowing of a region (object) corresponding to the intermediate pixel, specifically, narrowing of a thin line having a lower density than the background (hereinafter also referred to as "thin line of low density") can be suppressed. For example, this suppresses a defect that a thin line forming a white character and so on becomes excessively narrow and a defect that such thin line is broken (also referred to as "break of thin line").

For example, in the original image OI in FIG. 4A, as described above, the plurality of pixels PX1 has the density V that is higher than or equal to the reference density Th1, and forms background. The density V of the pixels PX1 satisfies VMdot≤V<VLdot. The plurality of pixels PX2 is intermediate pixels having the density V that is lower than or equal to the reference density Th2, and forms a thin line. For example, this thin line is a part of a small character having a height of four points (approximately 1.4 mm). The plurality of pixels EP is the particular edge pixel.

Figure 4B:
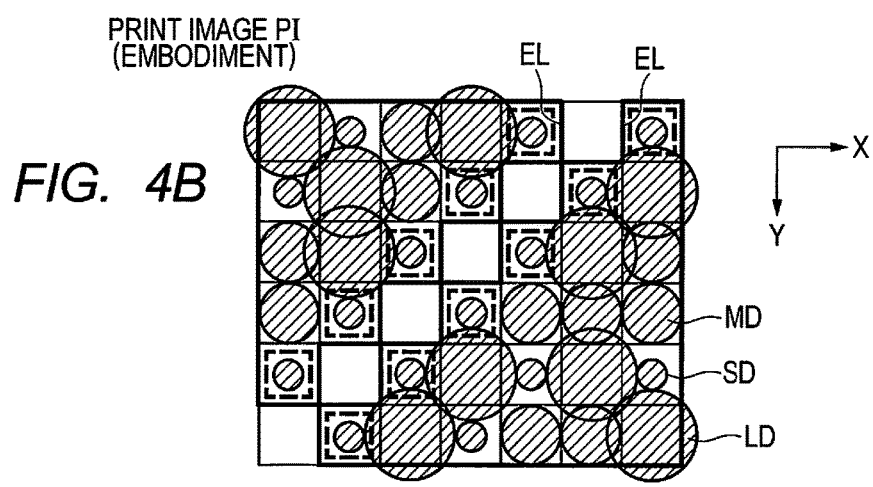
Figure 4C:
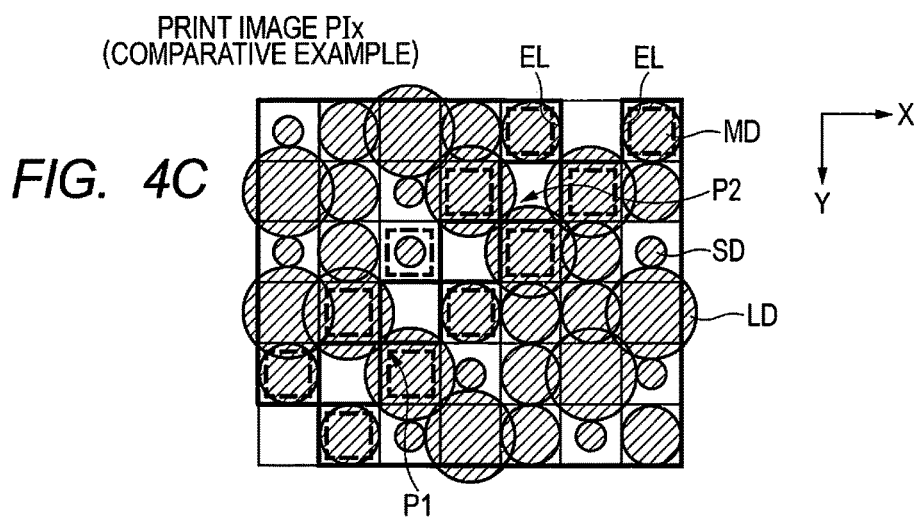

FIG. 4B shows a print image PI represented by dot data generated by the error diffusion process (FIG. 3) of the first embodiment. FIG. 4C shows a print image Ph represented by dot data generated by the error diffusion process of a comparative example. The error diffusion process of the comparative example is a process excluding S140 and S160 from the flowchart of FIG. 3. That is, the error diffusion process of the comparative example is a common error diffusion process in which the normal process of S150 in FIG. 3 is executed for all the target pixels. The thick solid lines EL in the print images PI, PIx show edges between the plurality of pixels PX1 forming background and the plurality of pixels PX2 forming a thin line in the original image OI. The circle marks LD, MD, and SD with hatching in the print images PI, PIx show large dots, middle dots, and small dots, respectively.

In the print image PIx of the comparative example shown in FIG. 4C, there is a case where large dots are formed at positions corresponding to the plurality of pixels PX2 along the edge EL in the original image OI, that is, positions corresponding to the particular edge pixels EP. For example, depending on the state of the background and other objects around a thin line in the original image OI and so on, in the error diffusion process, there is a case where the distribution error value Ed distributed from the particular edge pixel EP becomes an excessively large value. In that case, dots tend to be formed at positions in the print image corresponding to pixels adjacent to the particular edge pixel EP, for example, other particular edge pixels EP adjacent to the particular edge pixel EP and intermediate pixels. As a result, for example, compared with the first embodiment, there is a higher possibility that large dots are formed at positions corresponding to the other particular edge pixel EP adjacent to the particular edge pixels EP and a higher possibility that small dots are formed at positions corresponding to the intermediate pixels. For example, in the print image PIx of FIG. 4C, a relatively large number of large dots are formed at positions corresponding to the particular edge pixels EP. As a result, the thin line becomes excessively narrow, and the thin line is broken at portions P1, P2 indicated by the arrows.

In contrast, in the print image PI of the first embodiment shown in FIG. 4B, it is suppressed that the distribution error value Ed distributed from the particular edge pixel EP to adjacent pixels becomes an excessively large value. Thus, compared with the print image PIx of the comparative example, defects that a thin line becomes excessively narrow and that a thin line is broken are suppressed.

Further, in the first embodiment, when the second dot forming condition is satisfied (S140: YES in FIG. 3, and YES in one of S310, S330, and S340 in FIG. 7), the distribution error value Ed is set to the value (Va−V) corresponding to the density of an imaginary dot having the target pixel density V (S325, S365 in FIG. 7). As a result, the distribution error value Ed is set to an appropriate value suitable for the target pixel density V. This can suppress a defect that may occur when the distribution error value Ed is an inappropriate value. For example, as a comparison, when the distribution error value Ed is excessively large, in the print image, dots tend to be formed at positions corresponding to pixels around the particular edge pixel EP. This may cause, in the print image PI, a defect that the density around the thin line becomes higher than the density of the original image OI, and a defect that dots are formed at positions corresponding to the intermediate pixels PX2 forming a thin line in the original image OI and that the thin line becomes narrow. For example, as a comparison, when the distribution error value Ed is excessively small, in the print image, dots tend not to be formed at positions corresponding to pixels around the particular edge pixel EP. This may cause a defect that the density around the thin line becomes lower than the density of the original image OI.

Further, in the first embodiment, when the target pixel is the particular edge pixel (S140: YES in FIG. 3) and the target pixel density V is higher than or equal to the large dot density VLdot (S310: YES in FIG. 7), the second dot forming condition is satisfied and the dot value DV is set to a value indicative of forming a middle dot (S320 in FIG. 7). As a result, even when the density V of the particular edge pixel EP is higher than or equal to the large dot density VLdot, the dot value DV of the particular edge pixel EP is set to a value indicative of forming a middle dot smaller than a large dot. Accordingly, in the print image PI, no large dot is formed at a position corresponding to the particular edge pixel EP, the large dot being the largest-size dot that can be formed by the printer 200, thereby suppressing narrowing of the thin line.

Further, in this case, the target pixel density V is higher than or equal to the large dot density VLdot (V≥VLdot). Thus, although the dot value DV is set to a value indicative of forming a middle dot (S320 in FIG. 7), the distribution error value Ed is set to the value (Va−V) that is lower than or equal to the value (Va−VLdot) corresponding to the large dot density VLdot ((Va−VLdot)≥(Va−V)). This suppresses that the distribution error value Ed distributed from the particular edge pixel EP to adjacent pixels becomes excessively large, and thereby suppressing a defect that a thin line becomes narrow and a defect that the density around the thin line becomes high in the print image PI.

Further, in the first embodiment, when the target pixel is the particular edge pixel (S140: YES in FIG. 3) and when the target pixel density V is higher than or equal to the middle dot density VMdot (S330: YES in FIG. 7), the second dot forming condition is satisfied and the dot value DV is set to a value indicative of forming a small dot (S360 in FIG. 7). As a result, even when the density V of the particular edge pixel EP is higher than or equal to the middle dot density VMdot, the dot value DV of the particular edge pixel EP is set to a value indicative of forming a small dot smaller than a middle dot. Accordingly, in the print image PI, a small dot that is relatively small tends to be formed at a position corresponding to the particular edge pixel EP, and hence narrowing of a thin line can be suppressed.

Further, in this case, the target pixel density V is higher than or equal to the middle dot density VMdot (V≥VMdot). Thus, although the dot value DV is set to a value indicative of forming a small dot (S360 in FIG. 7), the distribution error value Ed is set to the value (Va−V) that is lower than or equal to the value (Va−VMdot) corresponding to the middle dot density VMdot ((Va−VMdot) (Va−V)). This suppresses that the distribution error value Ed distributed from the particular edge pixel EP to adjacent pixels becomes excessively large, thereby suppressing a defect that a thin line becomes narrow and a defect that the density around the thin line becomes high in the print image PI.

As described above, in the first embodiment, in the print image PI, a dot having a lower density than the density V of the particular edge pixel EP tends to be formed at a position corresponding to the particular edge pixel EP. For example, a middle dot is formed if VLdot≤V, and a small dot is formed if VMdot≤V<VLdot. As a result, in the print image PI, narrowing of a thin line can be suppressed. For example, in the print image PI of FIG. 4B, unlike the print image PIx of FIG. 4C, all the dots formed at positions corresponding to the particular edge pixels EP are small dots. Thus, in the print image PI, compared with the print image Ph, the width of the thin line corresponding to the plurality of pixels PX2 in the original image OI is wider.

Further, according to the first embodiment, when the target pixel is the particular edge pixel (S140: YES in FIG. 3) and the target pixel density V is lower than the middle dot density VMdot (S330: NO in FIG. 7) and higher than or equal to the small dot density VSdot (S340: YES in FIG. 7), the second dot forming condition is satisfied and the dot value DV is set to a value indicative of forming a small dot. As a result, in the original image OI, when the density V of the particular edge pixel EP is lower than the middle dot density VMdot and higher than or equal to the small dot density VSdot of a small dot that is the smallest dot that can be formed, in the print image PI, a small dot is formed at a position corresponding to the particular edge pixel EP. This suppresses that an edge of a thin line surrounded by background having a density satisfying VSdot≤V<VMdot in the original image OI has jaggies in the print image PI.

Further, according to the first embodiment, when the target pixel is the particular edge pixel (S140: YES in FIG. 3) and the target pixel density V is lower than the small dot density VSdot (S340: NO in FIG. 7) and higher than or equal to the particular density VSS (S350: YES in FIG. 7), the dot value DV is set to a value indicative of forming a small dot (S360 in FIG. 7). This suppresses that an edge in a region surrounded by edge pixels having a density lower than the small dot density VSdot and higher than or equal to the particular density VSS in the original image OI has jaggies in the print image PI. For example, when only the common error diffusion process is executed as in the comparative example, in a print image, there are positions where dots are formed and positions where no dots are formed at a plurality of positions corresponding to the plurality of particular edge pixels EP. This edge tends to have jaggies. In the present embodiment, this defect can be suppressed.

Further, according to the first embodiment, when the target pixel is not the particular edge pixel EP (S140: NO in FIG. 3), in the normal process shown in FIG. 6, the first dot forming condition is determined by using a plurality of determination threshold values TH_S, TH_M, and TH_L corresponding to a plurality of types (sizes) of dots (S210, 230, S250 in FIG. 6). And, one of the pluralities of types of dots is formed based on this determination result (S220, S240, S260 in FIG. 6). When the target pixel is the particular edge pixel EP (S140: YES in FIG. 3), in the special process shown in FIG. 7, the second dot forming condition is determined by using a plurality of threshold values VLdot, VMdot, and VSdot corresponding to the plurality of types of dots (S310, 330, S340 in FIG. 7). Based on this determination result, one of a middle dot and a small dot is formed (S325, S365 in FIG. 7). As a result, in both cases where the target pixel is the particular edge pixel EP and where the target pixel is not the particular edge pixel EP, an appropriate dot value DV is determined by using the plurality of threshold values.

Further, according to the first embodiment, when the target pixel is the particular edge pixel EP (S140: YES in FIG. 3), regardless of whether the target pixel satisfies the first dot forming condition, it is determined whether the second dot forming condition is satisfied based on the target pixel density V. In other words, when the target pixel is the particular edge pixel EP, regardless of the error value Et distributed from processed pixels to the target pixel, it is determined whether the second dot forming condition is satisfied by using only the target pixel density V. As a result, when the density of background surrounding a thin line (that is, the density of the particular edge pixel EP) is uniform in the original image OI, the edge of the thin line is formed in the print image PI by using one type of dot suitable for the density V of the background. For example, when the density of the background is higher than or equal to the particular density VSS and lower than the large dot density VLdot, the edge of the thin line is formed by using only small dots in the print image PI. For example, in the example of FIG. 4B, small dots are formed at positions corresponding to all the particular edge pixels EP forming the edge of the thin line. As a result, jaggies of an edge of a thin line in the print image PI can be suppressed. For example, in the print image PIx of the comparative example, there may be a case where a large dot is formed, a case where a middle dot is formed, and a case where no dot is formed at a position corresponding to the particular edge pixel EP due to the error value Et distributed to the particular edge pixel EP. In the present embodiment, such defect can be suppressed.

B. Second Embodiment

In a second embodiment, the contents of the special process are different from those of the first embodiment. The processes other than the special process in the second embodiment are the same as those of the first embodiment, and detailed descriptions thereof are omitted.

Figure 8:
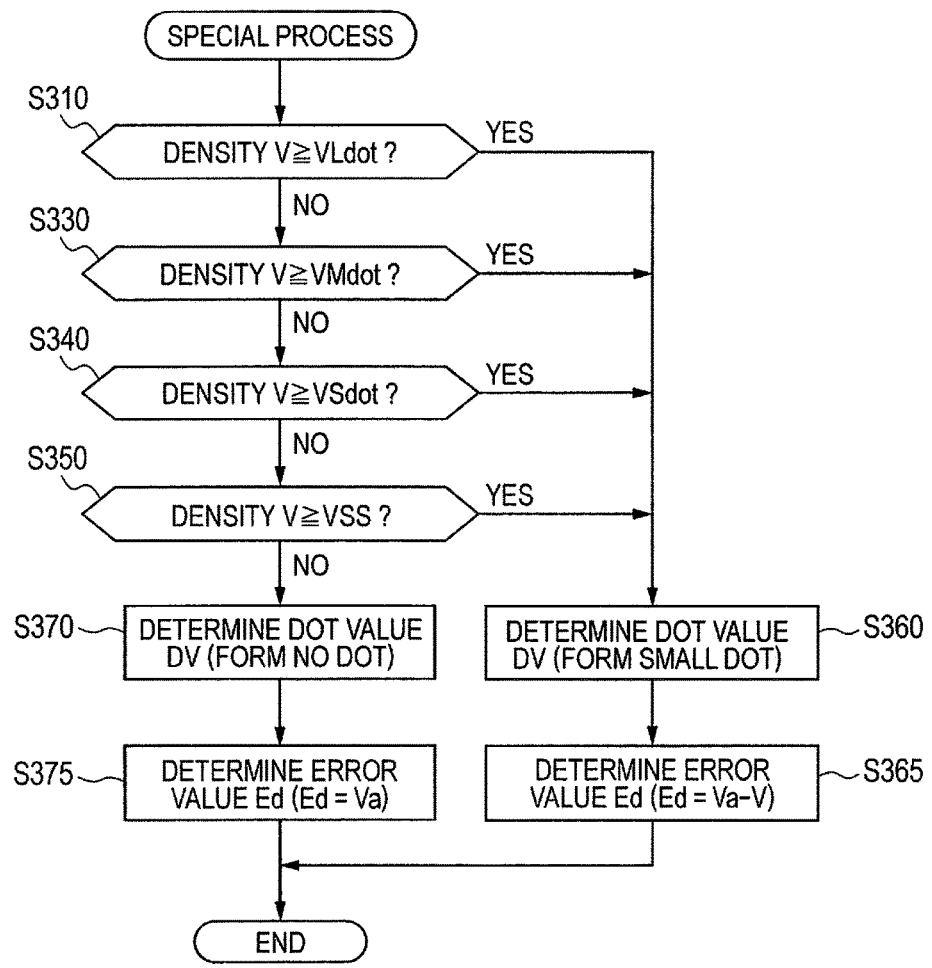
FIG. 8 is a flowchart of a special process of a second embodiment.

The special process of the second embodiment shown in FIG. 8 is different from the special process of the first embodiment shown in FIG. 7, in that steps S320 and S325 in FIG. 7 are not executed in the second embodiment.

In the special process of the second embodiment, when the target pixel density V is higher than or equal to the large dot density VLdot in S310 (S310: YES), in S360 the CPU 110 sets the dot value DV of the target pixel to a value indicative of forming a small dot. In the subsequent S365, the CPU 110 sets the distribution error value Ed to a value obtained by subtracting the target pixel density V from the corrected density Va.

In this way, in the special process of the second embodiment, in the print image PI, all the dots formed at positions corresponding to the particular edge pixels EP are small dots. In the print image PI, no middle dot or large dot is formed at positions corresponding to the particular edge pixels EP.

As in the first embodiment, the distribution error value Ed determined in S365 when determination in S310 is YES is a value (Va−V) obtained by subtracting the target pixel density V from the corrected density Va, that is, a value corresponding to the density of an imaginary dot having the target pixel density V. When determination in S310 is YES, the target pixel density V is higher than or equal to the large dot density VLdot. Accordingly, in this case, as in the first embodiment, the imaginary dot having the density V is a dot having a density higher than or equal to the large dot density VLdot, and is obviously a dot having a density higher than the small dot density VSdot (V≥VLdot>VSdot). Thus, the distribution error value Ed (=Va−V) in this case is smaller than or equal to the value (Va−VLdot) corresponding to the large dot density VLdot, and is considerably smaller than the value (Va−VSdot) corresponding to the small dot density VSdot of the small dot to be formed.

According to the above-described second embodiment, when the density V of the particular edge pixel EP is higher than or equal to the particular density VSS, in the print image PI, a small dot is always formed at a position corresponding to the particular edge pixel EP. Accordingly, when the density of background surrounding a thin line (that is, the density of the particular edge pixel EP) in the original image OI is higher than or equal to the particular density VSS, the edge of the thin line is always formed by small dots. As a result, narrowing of the thin line in the print image PI can be suppressed more reliably. Further, jaggies of the edge of the thin line in the print image PI can be suppressed more reliably.

C. Modification

While the disclosure has been described in detail with reference to the above aspects thereof, it would be apparent to those skilled in the art that various changes and modifications may be made therein without departing from the scope of the claims.

(1) In the above-described embodiment, it is determined in S140 of FIG. 3 whether the target pixel is the particular edge pixel, by using the filter group FG shown in FIG. 5B. Instead of this, it may be determined whether the target pixel is the particular edge pixel by another method. For example, the CPU 110 executes a character recognition process on original image data indicative of the original image OI, thereby determining whether the original image OI includes a character smaller than or equal to a particular size, for example, a character smaller than or equal to six points. When the original image OI includes a character smaller than or equal to six points, the CPU 110 determines whether the color of the recognized character smaller than or equal to six points is a color, such as white, having a lower density than the background. When the color of the recognized character smaller than or equal to six points has a lower density than the background, the CPU 110 identifies background pixels adjacent to pixels forming the character. The CPU 110 may identify such background pixels as the particular edge pixels. In this case, too, it can be considered that the particular edge pixel includes at least the particular edge pixel in the above-described first embodiment, that is, one of a pair of both end pixels, the both end pixels being a pair of pixels positioned at both ends of intermediate pixels in a particular direction (X direction or Y direction in the present embodiment), forming an edge with the intermediate pixels, and having a higher density than the intermediate pixels.

(2) In the above-described first embodiment, for understanding of the embodiment, the determination steps in S330 and S340 are executed in FIG. 7. Instead of this, in the actual special process, the determination steps in S330 and S340 may be omitted and only the determination step in S350 may be executed. This is because determination in S350 is always YES when determination in S330 or S340 is YES, and the steps executed when determination in S330 or S340 is YES (S360 and S365) are the same as the steps executed when determination in S350 is YES. Similarly, in FIG. 8, in the actual special process, the determination steps in S310, S330, and S340 may be omitted and only the determination step in S350 may be executed.

(3) In the special process of the above-described embodiments, the first dot forming condition based on the error diffusion method is not determined. Instead of this, in the special process, too, it may be determined whether the first dot forming condition is satisfied. For example, in the special process of the second embodiment shown in FIG. 8, the CPU 110 may determine whether the first dot forming condition of the middle dot is satisfied (that is, whether the corrected density Va of the target pixel is higher than or equal to the determination threshold for medium dot TH_M). When the first dot forming condition of the middle dot is satisfied, the CPU 110 may set the dot value DV to a value indicative of forming a middle dot. When the first dot forming condition of the middle dot is not satisfied, as shown in S310 to S350 in FIG. 8, the CPU 110 may determine whether to set the dot value DV to the value indicative of forming a small dot based on the target pixel density V.

(4) In S325, S365 of each of the above-described embodiments shown in FIGS. 7 and 8, the distribution error value Ed is set to the error value (Va−V) corresponding to the density of an imaginary dot having the target pixel density V. Instead of this, the distribution error value Ed may be set to a smaller value than the dot to be formed at a position corresponding to the target pixel, irrespective of the target pixel density V. For example, when the dot value DV of the target pixel is set to a value indicative of forming a small dot, the distribution error value Ed may be set to a value (Va−VSdot−50) that is smaller, by a particular value (50, for example), than the error value (Va−VSdot) corresponding to the small dot density.

(5) The printer 200 in each of the above-described embodiment is configured to form three sizes of dot: large, medium, and small. Alternatively, the printer may be configured to form dots of four sizes: extra-large, large, medium, and small. Alternatively, the printer may be configured to form dots of two sizes: large and small. When the printer is configured to form dots of the four sizes, in the normal process, it is determined whether the target pixel satisfies the dot forming condition of each of four sizes of dots by comparing, with the corrected density Va, four kinds of thresholds for four sizes of dots of extra-large, large, medium, and small. When one of the dot forming conditions is satisfied, the dot value of the target pixel is set to a value indicative of forming a dot having a size for which the dot forming condition is satisfied. In the special process of the first embodiment, for example, when the target pixel density V is higher than or equal to the extra-large dot density, the dot value DV may be set to a value indicative of forming a large dot. And, when the target pixel density V is lower than the extra-large dot density, the dot value DV may be determined in accordance with steps S310 to S375 in FIG. 7.

Alternatively, the printer 200 may be configured to form only one size dot. In this case, for example, in the normal process, it is determined whether the target pixel satisfies the dot forming condition by comparing the threshold for one size dot with the corrected density Va of the target pixel. Then, when the dot forming condition is satisfied, the dot value of the target pixel is set to a value indicative of forming a dot. In the special process, when the target pixel density V is higher than or equal to a particular value (for example, higher than or equal to a density Vdot of a dot), the dot value of the target pixel is set to a value indicative of forming a dot. In the normal process, when the dot value DV is set to the value indicative of forming the dot, the distribution error value Ed corresponding to the target pixel is set to a value (Va−Vdot) corresponding to the density Vdot of the dot to be formed. In the special process, when the dot value DV is set to the value indicative of forming the dot, the distribution error value Ed corresponding to the target pixel is set to a smaller value than the value (Va−Vdot) corresponding to the density Vdot of the dot to be formed.

(6) In each of the above-described embodiments, step S350 in the special process shown in FIGS. 7 and 8 may be omitted. In this case, when the target pixel density V is lower than the small dot density VSdot (S340: NO), the process advances to S370.

(7) The printing mechanism 290 of the printer according to each of the above embodiment forms images with four kinds of ink C, M, Y, and K. However, for example, the printer 200 may be a monochromatic printer which forms images with K (black) ink only. Alternatively, the printing mechanism 290 may have three kinds of ink C, M, and Y, or the printing mechanism 290 may have one or more kinds of other ink (for example, light cyan (LC), light magenta (LM)), and so on, in addition to the C, M, Y, and K. The printing mechanism 290 may be other types of printing mechanisms. For example, the printing mechanism 290 may be a laser printing mechanism which prints images with a plurality of kinds of toner as the coloring material.

(8) In each of the above-described embodiments, the printing process performed by the terminal apparatus 100 may, for example, be executed by the CPU 210 of the printer 200. In this case, the terminal apparatus 100 is not necessary. The terminal apparatus 100 may only transmit, to the printer 200, a print job based on a print instruction. In such a case, the printing mechanism 290 provided in the housing of the printer 200 is an example of the printer, and the CPU 210 provided in the housing of the printer 200 is an example of the image processor for the printer.

In addition, instead of the terminal apparatus 100, the server which is connected to the printer through a network such as Internet may perform a printing process of each embodiment. In this case, the printing process of each embodiment will be performed when a print job is transmitted from the terminal apparatus 100 or the printer 200 to the server. In S70 of FIG. 2, the server then transmits a print data to the printer 200, and the server causes the printer 200 to perform printing. In such a case, the server is an example of the image processor for the printer. The server may be a single computer or the so-called cloud server including a plurality of computers which communicate with each other.

(9) In each of the above-described embodiments, a part of configurations realized by hardware may be replaced with software, and conversely, a part or entirety of configurations realized by software may be replaced with hardware.

When a part or entirety of the functions of this disclosure is realized by a computer program, the program may be provided in a form stored in a computer-readable storage medium (for example, a non-transitory storage medium). The program may be used in a state where the program is stored in the same or different storage medium (computer-readable storage medium) from the storage medium by which the program is provided. The "computer-readable storage medium" may include a portable storage medium such as a memory card and a CD-ROM, an internal memory such as various ROM, and an external storage device, such as a hard disk drive, connected to the computer.

What is claimed is:
1. An image processor for a printer, comprising:
a processor; and
a memory storing instructions, the instructions, when executed by the processor, causing the processor to perform:
acquiring original image data representing an original image including a plurality of pixels, the original image data being indicative of a density of each of the plurality of pixels;
determining whether a target pixel in the plurality of pixels is an edge pixel, the edge pixel being a pixel constituting background and constituting an edge between the background and an object having a lower density than the background;
determining whether a first dot forming condition of an error diffusion method is satisfied, by using a density of the target pixel and an error value distributed to the target pixel;

determining a dot value indicative of a dot formation state of the target pixel, the determining the dot value including:
  in a case where the target pixel is not the edge pixel and the first dot forming condition is satisfied, setting the dot value to a value indicative of forming a first dot; and
  in a case where a second dot forming condition is satisfied, setting the dot value to a value indicative of forming a second dot, the second dot forming condition including that the target pixel is the edge pixel;
determining a distribution error value to be distributed to an unprocessed pixel, the determining the distribution error value including:
  in the case where the target pixel is not the edge pixel and the first dot forming condition is satisfied, setting the distribution error value to a value corresponding to a density of the first dot; and
  in the case where the second dot forming condition is satisfied, setting the distribution error value to a smaller value than a value corresponding to a density of the second dot; and
generating print data including the dot value of each of the plurality of pixels determined by processing each of the plurality of pixels as the target pixel.

2. The image processor according to claim 1, wherein the instructions, when executed by the processor, cause the processor to perform:
  in the case where the second dot forming condition is satisfied, setting the distribution error value to a value corresponding to a density of an imaginary dot having the density of the target pixel.

3. The image processor according to claim 1, wherein the printer is configured to form a first type dot and a second type dot smaller than the first type dot; and
  wherein the instructions, when executed by the processor, cause the processor to perform:
  in a case where the target pixel is the edge pixel and the density of the target pixel is higher than or equal to a density of the first type dot, determining that the second dot forming condition is satisfied and setting the dot value to a value indicative of forming the second type dot as the second dot.

4. The image processor according to claim 3, wherein the instructions, when executed by the processor, cause the processor to perform:
  in the case where the target pixel is the edge pixel and the density of the target pixel is higher than or equal to the density of the first type dot, determining that the second dot forming condition is satisfied and setting the distribution error value to a value lower than or equal to a value corresponding to the density of the first type dot.

5. The image processor according to claim 3, wherein the printer is configured to further form a third type dot smaller than the second type dot; and
  wherein the instructions, when executed by the processor, cause the processor to perform:
  in a case where the target pixel is the edge pixel and the density of the target pixel is lower than the density of the first type dot and higher than or equal to a density of the second type dot, determining that the second dot forming condition is satisfied and setting the dot value to a value indicative of forming the third type dot as the second dot.

6. The image processor according to claim 5, wherein the third type dot is a smallest dot the printer is configured to form; and
  wherein the instructions, when executed by the processor, cause the processor to perform:
  in a case where the target pixel is the edge pixel and the density of the target pixel is lower than the density of the second type dot and higher than or equal to a density of the third type dot, determining that the second dot forming condition is satisfied and setting the dot value to a value indicative of forming the third type dot.

7. The image processor according to claim 6, wherein the instructions, when executed by the processor, cause the processor to perform:
  in a case where the target pixel is the edge pixel and the density of the target pixel is lower than the density of the third type dot and higher than or equal to a particular density lower than the density of the third type dot, setting the dot value to a value indicative of forming the third type dot.

8. The image processor according to claim 7, wherein the instructions, when executed by the processor, cause the processor to perform:
  in the case where the target pixel is the edge pixel and the density of the target pixel is lower than the density of the third type dot and higher than or equal to the particular density, setting the distribution error value to a value larger than a value corresponding to the density of the third type dot.

9. The image processor according to claim 1, wherein the printer is configured to form a first type dot and a second type dot smaller than the first type dot; and
  wherein the instructions, when executed by the processor, cause the processor to perform:
  determining whether the first dot forming condition of the first type dot is satisfied, by using a first threshold value;
  determining whether the first dot forming condition of the second type dot is satisfied, by using a second threshold value smaller than the first threshold value;
  in a case where the target pixel is not the edge pixel and the first dot forming condition of the first type dot is satisfied, setting the dot value to a value indicative of forming the first type dot as the first dot;
  in a case where the target pixel is not the edge pixel and the first dot forming condition of the second type dot is satisfied, setting the dot value to a value indicative of forming the second type dot as the first dot;
  in a case where the target pixel is the edge pixel and the density of the target pixel is higher than or equal to a third threshold value, setting the dot value to a value indicative of forming the first type dot as the second dot; and
  in a case where the target pixel is the edge pixel and the density of the target pixel is lower than the third threshold value and higher than or equal to a fourth threshold value smaller than the third threshold value, setting the dot value to a value indicative of forming the second type dot as the second dot.

10. The image processor according to claim 1, wherein the instructions, when executed by the processor, cause the processor to perform:
  in a case where the target pixel is the edge pixel, regardless of whether the target pixel satisfies the first dot forming condition, determining whether the second dot forming condition is satisfied based on the density of the target pixel.

11. The image processor according to claim 1, wherein the value corresponding to the density of the first dot is obtained by subtracting the density of the first dot from a corrected density, the corrected density being a sum of the density of the target pixel and the error value distributed to the target pixel; and wherein the smaller value than the value corresponding to the density of the second dot is obtained by subtracting the density of the target pixel from the corrected density.

12. A non-transitory computer-readable storage medium storing a set of program instructions executable on an image processor for a printer, the set of program instructions comprising:

acquiring original image data representing an original image including a plurality of pixels, the original image data being indicative of a density of each of the plurality of pixels;

determining whether a target pixel in the plurality of pixels is an edge pixel, the edge pixel being a pixel constituting background and constituting an edge between the background and an object having a lower density than the background;

determining whether a first dot forming condition of an error diffusion method is satisfied, by using a density of the target pixel and an error value distributed to the target pixel;

determining a dot value indicative of a dot formation state of the target pixel, the determining the dot value including:
in a case where the target pixel is not the edge pixel and the first dot forming condition is satisfied, setting the dot value to a value indicative of forming a first dot; and
in a case where a second dot forming condition is satisfied, setting the dot value to a value indicative of forming a second dot, the second dot forming condition including that the target pixel is the edge pixel;

determining a distribution error value to be distributed to an unprocessed pixel, the determining the distribution error value including:
in the case where the target pixel is not the edge pixel and the first dot forming condition is satisfied, setting the distribution error value to a value corresponding to a density of the first dot; and
in the case where the second dot forming condition is satisfied, setting the distribution error value to a smaller value than a value corresponding to a density of the second dot; and generating print data including the dot value of each of the plurality of pixels determined by processing each of the plurality of pixels as the target pixel.

13. The non-transitory computer-readable storage medium according to claim 12, wherein the set of program instructions comprises:

in the case where the second dot forming condition is satisfied, setting the distribution error value to a value corresponding to a density of an imaginary dot having the density of the target pixel.

14. The non-transitory computer-readable storage medium according to claim 12, wherein the printer is configured to form a first type dot and a second type dot smaller than the first type dot; and wherein the set of program instructions comprises:
in a case where the target pixel is the edge pixel and the density of the target pixel is higher than or equal to a density of the first type dot, determining that the second dot forming condition is satisfied and setting the dot value to a value indicative of forming the second type dot as the second dot.

15. The non-transitory computer-readable storage medium according to claim 14, wherein the set of program instructions comprises:

in the case where the target pixel is the edge pixel and the density of the target pixel is higher than or equal to the density of the first type dot, determining that the second dot forming condition is satisfied and setting the distribution error value to a value lower than or equal to a value corresponding to the density of the first type dot.

16. The non-transitory computer-readable storage medium according to claim 14, wherein the printer is configured to further form a third type dot smaller than the second type dot; and wherein the set of program instructions comprises:
in a case where the target pixel is the edge pixel and the density of the target pixel is lower than the density of the first type dot and higher than or equal to a density of the second type dot, determining that the second dot forming condition is satisfied and setting the dot value to a value indicative of forming the third type dot as the second dot.

17. The non-transitory computer-readable storage medium according to claim 16, wherein the third type dot is a smallest dot the printer is configured to form; and wherein the set of program instructions comprises:
in a case where the target pixel is the edge pixel and the density of the target pixel is lower than the density of the second type dot and higher than or equal to a density of the third type dot, determining that the second dot forming condition is satisfied and setting the dot value to a value indicative of forming the third type dot.

18. The non-transitory computer-readable storage medium according to claim 17, wherein the set of program instructions comprises:

in a case where the target pixel is the edge pixel and the density of the target pixel is lower than the density of the third type dot and higher than or equal to a particular density lower than the density of the third type dot, setting the dot value to a value indicative of forming the third type dot.

19. The non-transitory computer-readable storage medium according to claim 12, wherein the printer is configured to form a first type dot and a second type dot smaller than the first type dot; and wherein the set of program instructions comprises:
determining whether the first dot forming condition of the first type dot is satisfied, by using a first threshold value;
determining whether the first dot forming condition of the second type dot is satisfied, by using a second threshold value smaller than the first threshold value;
in a case where the target pixel is not the edge pixel and the first dot forming condition of the first dot is satisfied, setting the dot value to a value indicative of forming the first type dot as the first dot;
in a case where the target pixel is not the edge pixel and the first dot forming condition of the second type dot is satisfied, setting the dot value to a value indicative of forming the second type dot as the first dot;

in a case where the target pixel is the edge pixel and the density of the target pixel is higher than or equal to a third threshold value, setting the dot value to a value indicative of forming the first type dot as the second dot; and in a case where the target pixel is the edge pixel and the density of the target pixel is lower than the third threshold value and higher than or equal to a fourth threshold value smaller than the third threshold value, setting the dot value to a value indicative of forming the second type dot as the second dot.

20. The non-transitory computer-readable storage medium according to claim 12, wherein the set of program instructions comprises:

in a case where the target pixel is the edge pixel, regardless of whether the target pixel satisfies the first dot forming condition, determining whether the second dot forming condition is satisfied based on the density of the target pixel.

* * * * *